US012605917B2

(12) United States Patent
Tynys et al.

(10) Patent No.: US 12,605,917 B2
(45) Date of Patent: Apr. 21, 2026

(54) MULTILAYER SHEET COMPRISING A FOAMED LAYER SUITABLE FOR FOOD PACKAGING

(71) Applicant: BOREALIS AG, Vienna (AT)

(72) Inventors: Antti Tynys, Linz (AT); Yi An Lin, New Taipei (TW)

(73) Assignee: BOREALIS AG, Vienna (AT)

( * ) Notice: Subject to any disclaimer, the term of this patent is extended or adjusted under 35 U.S.C. 154(b) by 157 days.

(21) Appl. No.: 18/249,476

(22) PCT Filed: Nov. 2, 2021

(86) PCT No.: PCT/EP2021/080341
§ 371 (c)(1),
(2) Date: Apr. 18, 2023

(87) PCT Pub. No.: WO2022/096436
PCT Pub. Date: May 12, 2022

(65) Prior Publication Data
US 2023/0405969 A1     Dec. 21, 2023

(30) Foreign Application Priority Data
Nov. 3, 2020    (EP) ................................... 20205425

(51) Int. Cl.
*B32B 5/18*        (2006.01)
*B32B 27/06*       (2006.01)
*B32B 27/32*       (2006.01)

(52) U.S. Cl.
CPC .............. *B32B 5/18* (2013.01); *B32B 27/065* (2013.01); *B32B 27/32* (2013.01); *B32B 2250/02* (2013.01); *B32B 2255/102* (2013.01); *B32B 2266/025* (2013.01); *B32B 2307/51* (2013.01); *B32B 2307/54* (2013.01); *B32B 2307/718* (2013.01); *B32B 2307/7244* (2013.01); *B32B 2307/7246* (2013.01); *B32B 2307/7376* (2023.05); *B32B 2439/70* (2013.01)

(58) Field of Classification Search
CPC .......... B32B 2250/02; B32B 2255/102; B32B 2255/26; B32B 2266/025; B32B 2307/51; B32B 2307/54; B32B 2307/718; B32B 2307/72; B32B 2307/7244; B32B 2307/7246; B32B 2307/732; B32B 2307/7376; B32B 2439/70; B32B 27/065; B32B 27/32; B32B 5/18
See application file for complete search history.

(56) References Cited

U.S. PATENT DOCUMENTS

| | | | |
|---|---|---|---|
| 5,149,579 A | 9/1992 | Park et al. | |
| 2007/0184259 A1* | 8/2007 | Brunner ................. | B29C 44/24 |
| | | | 428/318.4 |
| 2016/0082693 A1* | 3/2016 | Li .......................... | B32B 27/32 |
| | | | 428/318.6 |
| 2018/0201752 A1* | 7/2018 | Lin ......................... | B32B 27/08 |
| 2022/0177682 A1* | 6/2022 | Kaarto ................... | C08L 23/12 |

FOREIGN PATENT DOCUMENTS

| | | | |
|---|---|---|---|
| DE | 3539352 | C2 | 5/1986 |
| EP | 0787750 | B1 | 5/1998 |
| EP | 0879830 | B1 | 11/1998 |
| EP | 0890612 | A2 | 7/1999 |
| EP | 1892264 | A1 | 2/2008 |
| EP | 3127951 | A1 | 2/2017 |
| EP | 3216720 | A1 | 9/2017 |
| JP | 2006-35832 | A | 2/2006 |
| JP | 2019-42988 | A | 3/2019 |
| RU | 2368507 | C2 | 9/2009 |
| RU | 2708857 | C2 | 12/2019 |
| WO | 1996/025290 | A1 | 8/1996 |
| WO | 2017/021292 | A1 | 2/2017 |

OTHER PUBLICATIONS

Russian Application No. 2023113039/05, Office Action dated Nov. 24, 2023.
Russian Application No. 2023113039/05, Search Report Dated Nov. 20, 2023.
Japanese Application No. 2023-523544, Office Action dated Mar. 26, 2024.
Application No. 20205425.0 dated Apr. 21, 2020.
Naguib, Hani e., "Fundamental Foaming Mechanisms Governing the Volume, Expansion of Extruded Polypropylene Foams", Journal of Applied Polymer Science, vol. 91, 2661-2668 (2004).
Wagner, M. H. "Rheotens-Mastercurves and Drawability of Polymer Melts", 30 Polymer Engineering and Science, vol. 36, pp. 925 to 935, (2004).

* cited by examiner

*Primary Examiner* — Hai Vo
(74) *Attorney, Agent, or Firm* — Tarolli, Sundheim, Covell & Tummino LLP

(57)        ABSTRACT

The present invention relates to a multilayer sheet comprising at least two layers (A) and (B) in adherent contact with each other, wherein layer (A) is a foamed sheet comprising a high melt strength polypropylene composition and layer (B) is a coated non-foamed layer, which comprises a polypropylene composition, a process for producing said multilayer sheet, an article comprising said multilayer sheet and the use of said multilayer sheet for the production of an article with improved water vapor transmission and oxygen transmission properties.

12 Claims, No Drawings

MULTILAYER SHEET COMPRISING A FOAMED LAYER SUITABLE FOR FOOD PACKAGING

The present invention relates to a multilayer sheet comprising at least two layers (A) and (B) in adherent contact with each other, wherein layer (A) is a foamed sheet comprising a high melt strength polypropylene composition and layer (B) is a coated non-foamed layer, which comprises a polypropylene composition, a process for producing said multilayer sheet, an article comprising said multilayer sheet and the use of said multilayer sheet for the production of an article with improved water vapor transmission and oxygen transmission properties.

TECHNICAL BACKGROUND

In many food packaging application, especially in dairy packaging like milk and yogurt cups, an excellent barrier properties against oxygen and moisture penetration in combination with good insulation properties are needed in order to ensure long shelf life time of the packed product. In addition to the barrier and insulation properties, monomaterial solution is required for easy and efficient recycling of the used packaging using existing recycling streams. The used packaging material needs to have also sufficient mechanical properties in order to be suitable in the final applications. Currently LDPE coated paper board is commonly used in dairy packaging. However, the barrier properties of LDPE coated paper board is normally not optimal leading to shorter shelf life time of the packed product. Additionally, the LDPE coated paper board is a multicomponent system, which makes the recycling process more awkward and expensive. Therefore, the recent focus in dairy packaging development has been on novel packaging material solutions, which fulfil the requirements as described above, especially improved barrier properties against moisture and oxygen penetration.

High melt strength polypropylene compositions and foams made thereof are generally known in the art. However, obtaining a homogeneous and improved foam quality thereof remains a challenge. With improved foam quality the same or even improved mechanical properties can be obtained with articles having lower thickness.

For example, in case of cups made from polypropylene foam the wall thickness can be reduced allowing for more cups being stored in the same volume and, thus, reducing storage and transportation costs. Moreover, the amount of material subjected to recycling processes or waste treatment is reduced.

One method to produce high melt strength polypropylene (HMS-PP) is described in EP 0 879 830, filed by Borealis in 1997. It describes the basics of the Borealis high melt strength (HMS) post-reactor process where peroxide and with bifunctionally unsaturated monomer(s) and/or with multifunctionally unsaturated low molecular weight polymer(s) are used to make long chain branched polypropylene materials.

WO 2017/021292 discloses a foamed sheet of high melt strength polypropylene (HMS-PP) with improved mechanical strength, which can be used for application requiring mechanical stability such as containers also for liquids, when laminated with a biaxially oriented polypropylene (BOPP) film on its interior side.

Although foamed sheets of high melt strength polypropylene (HMS-PP) show superior mechanical strength, they are not known for good barrier properties needed for perishable food applications such as dairy products. In the present invention it has surprisingly been found that a multilayer sheet comprising a foamed sheet of high melt strength polypropylene (HMS-PP) that is coated with a coating layer of non-foamed polypropylene shows excellent barrier properties in regard of against oxygen and moisture penetration in combination with good insulation properties and mechanical strength which allows for superior food packaging, especially for perishable food such as dairy product, compared to the state-of-the-art solutions. Additionally, the multilayer sheet is made only of polypropylene and therefore is more easily recyclable compared to composite materials such as of LDPE coated paper board.

SUMMARY OF THE INVENTION

The present invention relates to a multilayer sheet comprising at least two layers (A) and (B), wherein
  layer (A) is a foamed sheet having a density of from 100 to 300 kg/m³, preferably from 125 to 275 kg/m³, more preferably from 150 to 250 kg/m³ and most preferably from 175 to 225 kg/m³, and comprises a high melt strength polypropylene composition comprising from 85.0 to 100 wt %, preferably from 90.0 to 99.9 wt % and most preferably from 92.0 to 99.8 wt % of a high melt strength propylene polymer with long chain branches, based on the total weight amount of the layer (A);
  layer (B) is a coated non-foamed layer, which comprises a polypropylene composition comprising from 85.0 to 100 wt %, preferably from 90.0 to 99.9 wt % and most preferably from 95.0 to 99.8 wt % of a linear propylene polymer, based on the total weight amount of the layer (B);
wherein layers (A) and (B) are in adherent contact with each other.

In another aspect the present invention relates to a process for producing the multilayer sheet as described above or below comprising the steps of:
  a) foaming the high melt strength polypropylene composition to a foamed sheet having a density of from 100 to 300 kg/m³, preferably from 125 to 275 kg/m³, more preferably from 150 to 250 kg/m³ and most preferably from 175 to 225 kg/m³ to form layer (A);
  b) coating layer (A) with the polypropylene composition to obtain layer (B) in adherent contact with layer (A).

In yet another aspect the present invention relates to an article comprising the multilayer sheet as described above or below.

In still another aspect the present invention relates to the use of the multilayer sheet as described above or below for the production of an article with improved water vapor transmission and oxygen transmission properties.

Said article is preferably a food packaging, preferably a dairy packaging like a milk carton and cups for cream cheese or yogurt.

Definitions

According to the present invention, the expression "propylene homopolymer" relates to a polypropylene that consists substantially, i.e. of at least 99.0 wt %, more preferably of at least 99.5 wt %, still more preferably of at least 99.8 wt %, like at least 99.9 wt % of propylene units. In another embodiment, only propylene units are detectable, i.e. only propylene has been polymerized.

The expression "propylene copolymer" relates to a polypropylene which comprises propylene monomer units and comonomer units, preferably selected from $C_4$-$C_{12}$ alpha-olefins. The amount of comonomer units in the propylene copolymer is at least 0.1 wt %, preferably at least 0.2 wt %, still more preferably at least 0.5 wt %. In the present invention the amount of comonomer units in the propylene copolymer suitably exceeds 0.5 wt %.

A propylene random copolymer is a copolymer of propylene monomer units and comonomer units, such as e.g. comonomer units being selected from $C_4$-$C_{12}$ alpha-olefins, in which the comonomer units are distributed randomly over the polymeric chain. The propylene random copolymer can comprise comonomer units from one or more comonomers different in their amounts of carbon atoms. A propylene random copolymer does not include an elastomeric phase.

"In adherent contact" in the sense of the present invention means that layers (A) and (B) are in direct contact without any intermediate layers between layers (A) and (B).

In the process of the invention it means that coating layer (B) is directly coated onto one surface of layer (A) without any additional layers between layers (A) and (B).

The term "linear propylene polymer" indicates that the linear propylene polymer shows no or nearby no-branching structure.

Percentages are usually given herein as weight-% (wt %) if not stated otherwise.

DETAILED DESCRIPTION OF THE INVENTION

The present invention relates to a multilayer sheet comprising at least two layers (A) and (B), wherein layer (A) is a foamed sheet having a density of from 100 to 300 kg/m³, preferably from 125 to 275 kg/m³, more preferably from 150 to 250 kg/m³ and most preferably from 175 to 225 kg/m³, and comprises a high melt strength polypropylene composition comprising from 85.0 to 100 wt %, preferably from 90.0 to 99.9 wt % and most preferably from 92.0 to 99.8 wt % of a high melt strength propylene polymer with long chain branches, based on the total weight amount of the high melt strength polypropylene composition;

layer (B) is a coated non-foamed layer, which comprises a polypropylene composition comprising from 85.0 to 100 wt %, preferably from 90.0 to 99.9 wt % and most preferably from 95.0 to 99.8 wt % of a linear propylene polymer, based on the total weight amount of the polypropylene composition;

wherein layers (A) and (B) are in adherent contact with each other.

High Melt Strength Propylene Polymer

The major component of the high melt strength polypropylene composition of layer (A) is a high melt strength propylene polymer.

The high melt strength propylene polymer is present in the high melt strength polypropylene composition in an amount of from 85.0 to 100 wt %, preferably from 90.0 to 99.9 wt % and most preferably from 92.0 to 99.8 wt %, based on the total weight amount of the high melt strength polypropylene composition.

A high melt strength propylene polymer is branched and, thus, differs from a linear propylene polymer in that the polypropylene backbone covers side chains whereas a non-branched propylene polymer, i.e. a linear propylene polymer, does not cover side chains. The side chains have significant impact on the rheology of the propylene polymer.

Accordingly linear propylene polymers and high melt strength propylene polymers can be clearly distinguished by their flow behaviour under stress.

Branching can be generally achieved by using specific catalysts, i.e. specific single-site catalysts, or by chemical modification. Concerning the preparation of a branched propylene polymer obtained by the use of a specific catalyst reference is made to EP 1 892 264. With regard to a branched propylene polymer obtained by chemical modification it is referred to EP 0 879 830 A1. In such a case the branched propylene polymer is also called high melt strength propylene polymer. The high melt strength propylene polymer is obtained by chemical modification of a propylene polymer as described in more detail below. High melt strength propylene polymers are commercially available from Borealis AG under the trade name Daploy™.

Therefore the high melt strength propylene polymer, as the major component of the high melt strength polypropylene composition has an $F_{30}$ melt strength of more than 20.0 cN and a $v_{30}$ melt extensibility of more than 200 mm/s, preferably has an $F_{30}$ melt strength of more than 20.0 to 50.0 cN and a $v_{30}$ melt extensibility of more than 200 to 300 mm/s, in order to provide a resulting high melt strength polypropylene composition with good shear thinning properties. The $F_{30}$ melt strength and the $v_{30}$ melt extensibility are measured according to ISO 16790:2005.

Typically the instant high melt strength polypropylene composition also has an $F_{30}$ melt strength of more than 20.0 cN and a $v_{30}$ melt extensibility of more than 200 mm/s, preferably has an $F_{30}$ melt strength of more than 20.0 to 50.0 cN and a $v_3n$ melt extensibility of more than 200 to 300 mm/s.

In a preferred embodiment, the high melt strength propylene polymer has (a) an $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN or 34.0 cN to 42.0 cN; and (b) a $v_{30}$ melt extensibility of more than 200 mm/s, like more than 210 to 300 mm/s, more preferably more than 220 to 300 mm/s, still more preferably of more than 225 mm/s, yet more preferably of 225 to 300 mm/s, still yet more preferably of 230 to 290 mm/s, like 250 to 290 mm/s or 253 to 290 mm/s.

In an especially preferred embodiment the high melt strength propylene polymer has an $F_{30}$ melt strength of more than 20.0 cN and a $v_{30}$ melt extensibility of more than 200 to 300 mm/s, like an $F_{30}$ melt strength of more than 20.0 to 50.0 cN and $v_{30}$ melt extensibility of more than 220 to 300 mm/s, more preferably an $F_{30}$ melt strength of more than 21.0 cN and $v_{30}$ melt extensibility of more than 225 mm/s, still more preferably an $F_{30}$ melt strength of 21.0 to 50.0 cN and $v_{30}$ melt extensibility of 225 to 300 mm/s, yet more preferably an $F_{30}$ melt strength of 25.0 to 50.0 cN and $v_{30}$ melt extensibility of 230 to 290 mm/s, still yet more preferably an $F_{30}$ melt strength of 25.0 to 45.0 cN and $v_{30}$ melt extensibility of 230 to 290 mm/s, most preferably an $F_{30}$ melt strength of 30.0 to 45.0 cN and $v_{30}$ melt extensibility of 230 to 290 mm/s, like an $F_{30}$ melt strength of 32.0 to 42.0 cN and $v_{30}$ melt extensibility of 230 to 290 mm/s or an $F_{30}$ melt strength of 34.0 to 42.0 cN and $v_{30}$ melt extensibility of 250 to 290 mm/s or an $F_{30}$ melt strength of 34.0 to 42.0 cN and $v_{30}$ melt extensibility of 253 to 290 mm/s.

Further it is preferred that the high melt strength propylene polymer has a melt flow rate $MFR_2$ (230° C.) measured according to ISO 1133 of not more than 15.0 g/10 min, more preferably in a range of 0.5 to 15.0 g/10 min, yet more preferably in a range of 1.0 to 15.0 g/10 min, like in the range of 1.5 to 15.0 g/10 min.

In a particularly preferred embodiment the high melt strength propylene polymer has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Hence in one specific embodiment, the high melt strength propylene polymer has (a) a melt flow rate $MFR_2$ (230° C.) not more than 15.0 g/10 min, more preferably in a range of 0.5 to 15.0 g/10 min, yet more preferably in a range of 1.0 to 15.0 g/10 min, like in the range of 1.5 to 15.0 g/10 min;

(b) an $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN or 34.0 to 42.0 cN; and (c) a $v_{30}$ melt extensibility of more than 200 mm/s, preferably more than 210 to 300 mm/s, like of more than 220 to 300 mm/s, more preferably of more than 225 mm/s, still more preferably of 225 to 300 mm/s, yet more preferably of 230 to 290 mm/s like 250 to 290 mm/s or 253 to 290 mm/s.

In a particularly preferred variant of this embodiment the high melt strength propylene polymer has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Accordingly in a specific embodiment the high melt strength propylene polymer has a melt flow rate $MFR_2$ (230° C.) of not more than 15.0 g/10 min, an $F_{30}$ melt strength of more than 20.0 cN and a $v_{30}$ melt extensibility of more than 210 to 300 mm/s, like a melt flow rate $MFR_2$ (230° C.) in a range of 0.5 to 15.0 g/10 min, an $F_{30}$ melt strength of more than 20.0 to 50.0 cN and $v_{30}$ melt extensibility of more than 220 to 300 mm/s, more preferably a melt flow rate $MFR_2$ (230° C.) in a range of 0.5 to 15.0 g/10 min, an $F_{30}$ melt strength of more than 21.0 cN and $v_{30}$ melt extensibility of more than 225 mm/s, still more preferably a melt flow rate $MFR_2$ (230° C.) in a range of 1.0 to 15.0 g/10 min, an $F_{30}$ melt strength of 21.0 to 50.0 cN and $v_{30}$ melt extensibility of 225 to 300 mm/s, yet more preferably a melt flow rate $MFR_2$ (230° C.) in a range of 1.0 to 6.0 g/10 min, an $F_{30}$ melt strength of 25.0 to 50.0 cN and $v_{30}$ melt extensibility of 230 to 290 mm/s, still yet more preferably a melt flow rate $MFR_2$ (230° C.) in a range of 1.0 to 15.0 g/10 min, an $F_{30}$ melt strength of 25.0 to 45.0 cN and a $v_{30}$ melt extensibility of 230 to 290 mm/s, most preferably a melt flow rate $MFR_2$ (230° C.) in a range of 1.0 to 15.0 g/10 min, an $F_{30}$ melt strength of 30.0 to 45.0 cN and $v_{30}$ melt extensibility of 230 to 290 mm/s, like a melt flow rate $MFR_2$ (230° C.) in a range of 1.0 to 15.0 g/10 min, an $F_{30}$ melt strength of 32.0 to 42.0 cN and $v_{30}$ melt extensibility of 230 to 290 mm/s or a melt flow rate $MFR_2$ (230° C.) in a range of 1.0 to 15.0 g/10 min, an $F_{30}$ melt strength of 34.0 to 42.0 cN and $v_{30}$ melt extensibility of 250 to 290 mm/s or a melt flow rate $MFR_2$ (230° C.) in a range of 1.0 to 15.0 g/10 min, an $F_{30}$ melt strength of 34.0 to 42.0 cN and $v_{30}$ melt extensibility of 253 to 290 mm/s.

In a particularly preferred variant of this embodiment the high melt strength propylene polymer has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Preferably, the high melt strength propylene polymer has a melting temperature of from 140 to 180° C., more preferably from 150 to 175° C., most preferably from 155 to 170° C.

Additionally, the high melt strength propylene polymer preferably has a crystallization temperature of from 110 to 150° C., more preferably from 115 to 140° C. and most preferably from 120 to 135° C.

Further, the high melt strength propylene polymer can be a high melt strength random propylene copolymer, or a high melt strength propylene homopolymer, the latter being preferred.

In case the high melt strength propylene polymer is a high melt strength random propylene copolymer, it comprises monomers copolymerizable with propylene, for example comonomers such as ethylene and/or $C_4$ to $C_{12}$ alpha-olefins, in particular ethylene and/or $C_4$ to $C_{10}$ alpha-olefins, e.g. 1-butene and/or 1-hexene. Preferably the high melt strength random propylene copolymer comprises, especially consists of, monomers copolymerizable with propylene from the group consisting of ethylene, 1-butene and 1-hexene. More specifically the high melt strength random propylene copolymer comprises—apart from propylene—units derivable from ethylene and/or 1-butene. In a preferred embodiment the high melt strength random propylene copolymer comprises units derivable from ethylene and propylene only. The comonomer content in the high melt strength random propylene copolymer is preferably in the range of more than 0.2 to 10.0 mol %, still more preferably in the range of more than 0.5 to 7.0 mol %.

In this regard it is to mention that the high melt strength propylene polymer being either a high melt strength propylene homopolymer or a high melt strength random propylene copolymer may comprise additionally unsaturated monomers different to the comonomers defined for the high melt strength random propylene copolymer. In other words the high melt strength propylene homopolymer or the high melt strength random propylene copolymer may comprise unsaturated units, like bifunctionally unsaturated monomer(s) and/or multifunctionally unsaturated low molecular weight polymer(s) as defined in detail below, being different to propylene, ethylene and other $C_4$ to $C_{12}$ alpha-olefins. Accordingly the definition of homopolymer and copolymer in view of the high melt strength propylene polymer refers actually to the unmodified propylene polymer which is preferably a linear polypropylene, used to obtain the melt strength propylene polymer by chemical modification as defined in detail below.

Accordingly in one preferred embodiment the high melt strength propylene polymer comprises (a) if it is a high melt strength propylene homopolymer units derived from (i) propylene and (ii) bifunctionally unsaturated monomer(s) and/or multifunctionally unsaturated low molecular weight polymer(s), or (b) if it is a high melt strength random propylene copolymer units derived from (i) propylene (ii) ethylene and/or $C_4$ to $C_{12}$ alpha-olefins, e.g. 1-butene and/or 1-hexene, preferably erthylene, and (iii) bifunctionally unsaturated monomer(s) and/or multifunctionally unsaturated low molecular weight polymer(s), "Bifunctionally unsaturated" or "multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals (see below). The unsaturated sites in the bi- or multifunctionally unsaturated compounds are in their chemically bound state not actually "unsaturated", because the double bonds are each used for a covalent bond to the polymer chains of the unmodified propylene polymer preferably of the linear propylene polymer.

Reaction of the bifunctionally unsaturated monomer(s) and/or multifunctionally unsaturated low molecular weight polymer(s), preferably having a number average molecular weight (Mn)≤10000 g/mol, synthesized from one and/or more unsaturated monomers with the unmodified propylene polymer, preferably with the linear propylene polymer, are performed in the presence of a thermally free radical forming agent, e. g. decomposing free radical-forming agent, like a thermally decomposable peroxide.

The bifunctionally unsaturated monomers may be divinyl compounds, such as divinylaniline, m-divinylbenzene, p-divinylbenzene, divinylpentane and divinylpropane;

allyl compounds, such as allyl acrylate, allyl methacrylate, allyl methyl maleate and allyl vinyl ether;

dienes, such as 1,3-butadiene, chloroprene, cyclohexadiene, cyclopentadiene, 2,3-dimethylbutadiene, heptadiene, hexadiene, isoprene and 1,4-pentadiene;

aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight (Mn)≤10000 g/mol may be synthesized from one or more unsaturated monomers.

Examples of such low molecular weight polymers are polybutadienes, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred low molecular weight polymer is polybutadiene, in particular a polybutadiene having more than 50.0 wt % of the butadiene in the 1,2-(vinyl) configuration.

The high melt strength propylene polymer may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength propylene polymer is 0.01 to 10.0 wt % based on said high melt strength propylene polymer.

In a preferred embodiment the high melt strength propylene polymer is free of additives (A). Accordingly in case the instant polypropylene composition comprises additives (A), these additives (A) are not brought in the high melt strength polypropylene composition during the manufacture of the high melt strength propylene polymer.

The high melt strength propylene polymer further preferably has a low gel content usually below 1.00 wt %. Preferably the gel content is less than 0.80 wt %, more preferably less than 0.50 wt %.

A suitable high melt strength propylene polymer is WB140HMS™ commercially available from Borealis AG.

The Unmodified Propylene Polymer

As mentioned above, the high melt strength propylene polymer is a modified propylene polymer, which is obtained by reacting the unmodified propylene polymer with a thermally decomposing free radical-forming agent and optionally with bifunctionally unsaturated monomer(s) and/or with multifunctionally unsaturated low molecular weight polymer(s). The propylene polymer is preferably a linear propylene polymer.

It is preferred that the propylene polymer, preferably the linear propylene polymer, has a melt flow rate $MFR_2$ measured according to ISO 1133 in the range of 0.1 to 18.0 g/10 min, like of 0.1 to 15.0 g/10 min or 0.2 to 15.0 g/10 min, more preferably of 0.2 to below 10.0 g/10 min, still more preferably of 0.2 to 9.0 g/10 min, yet more preferably of 0.3 to 8.0 g/10 min.

The high melt strength propylene polymer differs from the propylene polymer which is used for its manufacture in that the backbone of the high melt strength propylene polymer covers side chains whereas the starting product, i.e. the propylene polymer including the preferred linear propylene polymer, does not cover or nearby does not cover side chains. The side chains have significant impact on the rheology of the polypropylene. Accordingly the starting product, i.e. the propylene polymer, and the obtained high melt strength propylene polymer can be clearly distinguished by its flow behaviour under stress.

Further, as mentioned above the propylene polymer is preferably a linear polypropylene. Due to the absence of branches, the linear propylene polymer is preferably featured by a low $v_{30}$ melt extensibility and/or a low $F_{30}$ melt strength.

Thus it is preferred that the linear propylene polymer has (a) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN like in the range of 2.5 to 45.0 cN; and (b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

In other words it is preferred that the linear propylene polymer has a $F_{30}$ melt strength of more than 1.0 cN and a $v_{30}$ melt extensibility of below 200 mm/s, preferably a $F_{30}$ melt strength of more than 2.0 cN and a $v_{30}$ melt extensibility of below 190 mm/s, more preferably a $F_{30}$ melt strength in the range of 1.0 to below 68.0 cN and a $v_{30}$ melt extensibility in the range of 100 to below 200 mm/s, yet more preferably a $F_{30}$ melt strength in the range of 1.5 to 65.0 cN and in the range of 120 to 190 mm/s, still yet more preferably a $F_{30}$ melt strength in the range of 2.0 to 60.0 cN and in the range of 120 to 190 mm/s, like a $F_{30}$ melt strength in the range of 2.5 to 50.0 cN and a $v_{30}$ melt extensibility in the range of 120 to 175 mm/s.

Accordingly in one specific embodiment the propylene polymer has (a) a melt flow rate $MFR_2$ measured according to ISO 1133 in the range of 0.1 to 18.0 g/10 min, like of 0.1 to 15.0 g/10 min or 0.2 to 15.0 g/10 min, more preferably of 0.2 to below 10.0 g/10 min, still more preferably of 0.2 to 9.0 g/10 min, yet more preferably of 0.3 to 8.0 g/10 min;

(b) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN like in the range of 2.5 to 45.0 cN; and (c) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

Therefore, in one specific embodiment the propylene polymer is a linear propylene polymer having a melt flow rate $MFR_2$ of 0.1 to 18.0 g/10 min, a $F_{30}$ melt strength of more than 1.0 cN and a $v_{30}$ melt extensibility of below 200 mm/s, preferably a melt flow rate $MFR_2$ (230° C.) in the range of 0.2 to 15.0 g/10 min, a $F_{30}$ melt strength of more than 2.0 cN and a $v_{30}$ melt extensibility of below 190 mm/s, more preferably a melt flow rate $MFR_2$ in the range of 0.2 to 15.0 g/10 min, a $F_{30}$ melt strength in the range of 1.0 to 68.0 cN and a $v_{30}$ melt extensibility in the range of 100 to below 200 mm/s, yet more preferably a melt flow rate $MFR_2$ in the range of 0.2 to below 10.0 g/10 min, a $F_{30}$ melt strength in the range of 2.0 to 60.0 cN and in the range of 120 to 190 mm/s, still yet more preferably a melt flow rate $MFR_2$ in the range of 0.2 to 9.0 g/10 min, a $F_{30}$ melt strength in the range of 2.5 to 50.0 cN and in the range of 120 to 190 mm/s, like a melt flow rate $MFR_2$ in the range of 0.3 to 8.0 g/10 min, a $F_{30}$ melt strength in the range of 2.5 to 45.0 cN and a $v_{30}$ melt extensibility in the range of 120 to 175 mm/s.

Preferably, the propylene polymer, preferably the linear propylene polymer, has a melting point of at least 140° C., more preferably of at least 150° C. and still more preferably of at least 158° C.

The propylene polymer, preferably the linear propylene polymer, can be produced in a known manner for instance by employing a single-site or a Ziegler Natta catalyst. The propylene polymer, preferably the linear propylene polymer, can be a propylene homopolymer, preferably a linear propylene homopolymer, or a random propylene copolymer, preferably a linear random propylene copolymer. Concerning the comonomer content and type of comonomer it is referred to the information provided above for the high melt strength random propylene copolymer. Preferably the propylene polymer is a linear propylene polymer. Still more preferably the propylene polymer is a linear propylene homopolymer. Accordingly all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer.

In a preferred embodiment the propylene polymer, preferably the linear propylene polymer, is free of additives.

Accordingly in case the instant high melt strength polypropylene composition comprises additives, these additives are preferably not brought in the high melt strength polypropylene composition during the manufacture of the high melt strength propylene polymer.

The Nucleating Agent

The high melt strength polypropylene composition can further comprise one or more, preferably one, nucleating agent(s).

The nucleating agent is preferably selected from: salts of monocarboxylic acids and polycarboxylic acids, for example sodium benzoate; Sorbitol compounds, for instance diacetals of sorbitol or xylitol, for example 1,3:2,4 Bis(3,4-dimethylbenzylidene) sorbitol (CAS-no. 135861-56-2, e.g. Millad 3988, supplier Milliken); nonitol based nucleating agents, for instance 1,2,3-trideoxy-4,6:5,7-bis-O-((4-propylphenyl) methylene) nonitol (CAS-no. 882073-43-0, e.g. Millad NX8000, supplier Milliken); Phosphorous-based compounds, for instance mono-, bis- or tetra-phenyl phosphates, for example Sodium 2,2'-methylene bis-(4,6-di-tert. butylphenyl) phosphate (CAS-no. 85209-91-2, e.g. NA-11, supplier Adeka Corporation) or Hydroxybis (2,4,8,10-tetra-tert. butyl-6-hydroxy-12H-dibenzo(d,g)(1.,3,2) dioxaphosphocin 6-oxidato) aluminium (CAS-no. 151841-65-5, e.g. ADK STAB NA-21, supplier Adeka Corporation), or talc or any mixtures thereof.

Talc is particularly preferred. In a preferred embodiment talc is the only nucleating agent present in the high melt strength polypropylene composition.

The particle size d50 of the nucleating agent, e.g. talc, is preferably within the range of 1 μm to 30 μm, more preferably within the range of 2 μm to 25 μm, still more preferably within the range of 5 μm to 20 μm and most preferably within the range of 5 μm to 15 μm.

The nucleating agent, preferably talc, is preferably present in the high melt strength polypropylene composition in an amount of from 0 to 15.0 wt %, more preferably from 0.1 to 10.0 wt % and most preferably from 0.2 to 8.0 wt %, based on the total weight amount of the high melt strength polypropylene composition.

The nucleating agent and, optionally, the additives can be introduced into the high melt strength polypropylene composition in the form of an additive mixture, wherein said additive mixture comprises, preferably consists of, a polymer, preferably a further high melt strength propylene polymer, the nucleating agent and, optionally, the additives.

The nucleating agent is usually not considered an additive. However, the nucleating agent is part of the additive mixture, if present.

The preferred further high melt strength propylene polymer is preferably prepared as the high melt strength propylene polymer of the major component of the high melt strength polypropylene composition and has properties in the same range as said high melt strength propylene polymer as described above.

In a specific embodiment the preferred high melt strength propylene polymer of the additive mixture and the high melt strength propylene polymer are the same.

Additives

The additives can be any additives useful in the technical area of the high melt strength propylene polymer and its applications. Accordingly the additives to be used in the high melt strength polypropylene composition and thus preferably in form of the additive mixture include, but are not limited to, stabilizers such as antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers, blowing agents, cling agents (e.g. poly-isobutene), lubricants and resins (ionomer waxes, PE- and ethylene copolymer waxes, Fischer-Tropsch waxes, Mon-tan-based waxes, Fluoro-based compounds, or paraffin waxes), as well as slip and antiblocking agents (e.g. Ca-stearate, erucamide, oleamide, talc natural silica and syn-thetic silica, or zeolites). Preferably the additives are selected from the group consisting of antioxidants (e.g. sterically hindered phenols, phosphites/phosphonites, sul-phur containing antioxidants, alkyl radical scavengers, aro-matic amines, hindered amine stabilizers, or blends thereof), metal deactivators (e.g. Irganox MD 1024), UV stabilizers (e.g. hindered amine light stabilizers), antistatic or antifog-ging agents (e.g. ethoxylated amines and amides, or glycerol esters), acid scavengers, blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), slip agents (e.g. Ca-stearate), antiblocking agents (e.g. erucamide, oleamide, talc natural silica and synthetic silica, or zeolites) and mixtures thereof.

Preferable additives are slip agents, such as for example Ca-stearate.

As outlined above, the additives do not encompass nucle-ating agent.

Typically the total amount of additives is not more than 15.0 wt %, more preferably not more than 10.0 wt %, like in the range of 0.1 to 10.0 wt %, preferably 0.1 to 5.0 wt %, more preferably 0.2 to 1.0 wt %, based on the total weight of the high melt strength polypropylene composition.

The High Melt Strength Polypropylene Composition

As mentioned above, the high melt strength polypropyl-ene composition comprises a high melt strength propylene polymer in an amount of from 85.0 to 100 wt %, preferably from 90.0 to 99.9 wt % and most preferably from 92.0 to 99.8 wt %, based on the total weight amount of the high melt strength polypropylene composition.

The high melt strength polypropylene composition can further comprise one or more nucleating agent(s) and addi-tives, preferably introduced in an additive mixture, as described above.

It is preferred that the high melt strength polypropylene composition does not comprise additional polymers with the exception of the polymer, preferably the high melt strength propylene polymer, of the additive mixture.

More preferably the high melt strength polypropylene composition comprises (a) 85.00 to 99.90 parts by weight preferably 87.50 to 99.80 parts by weight, more preferably 90.00 to 99.70 parts by weight, even more preferably 91.00 to 99.60 parts by weight, even more preferably 92.00 to 99.50 parts by weight of the high melt strength propylene polymer; and (b) 0.10 to 15.00 parts by weight, preferably 0.20 to 12.50 parts by weight, more preferably 0.30 to 10.00 parts by weight and most preferably 0.40 to 8.00 parts by weight of the nucleating agent (NA);

(c) optionally up to 20.00 parts by weight, preferably 1.00 to 10.00 parts by weight, more preferably 1.00 to 5.00 parts by weight, of a polymer of the additive mixture, preferably a high melt strength propylene polymer.

In one preferred embodiment the preferred high melt strength propylene polymer of the additive mixture (c) is the same as the high melt strength propylene polymer (a).

More, preferably the total amount of the high melt strength propylene polymer, the optional nucleating agent and the optional polymer of the additive mixture is at least 85 wt %, more preferably at least 90 wt %, even more preferably at least 95 wt %, and most preferably at least 99 wt %, based on the high melt strength polypropylene com-position.

As mentioned above the high melt strength propylene polymer, is a major part in the high melt strength polypro-pylene composition. Accordingly it is preferred that the high melt strength polypropylene composition shows a similar rheology behaviour as the high melt strength propylene polymer.

Thus the high melt strength polypropylene composition preferably has (a) an $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN or 34.0 cN to 42.0 cN; and (b) a $v_{30}$ melt extensibility of more than 200 mm/s, preferably more than 210 to 300 mm/s, like of more than 220 to 300 mm/s, more preferably of more than 225 mm/s, still more preferably of 225 to 300 mm/s, yet more preferably of 230 to 290 mm/s, like 250 to 290 mm/s or 253 to 290 mm/s.

In an especially preferred embodiment the high melt strength polypropylene composition has an $F_{30}$ melt strength of more than 20.0 cN and a $v_{30}$ melt extensibility of more than 200 mm/s, preferably more than 210 to 300 mm/s, like an $F_{30}$ melt strength of more than 20.0 to 50.0 cN and $v_{30}$ melt extensibility of more than 220 to 300 mm/s, more preferably an $F_{30}$ melt strength of more than 21.0 cN and $v_{30}$ melt extensibility of more than 225 mm/s, still more pref-erably an $F_{30}$ melt strength of 21.0 to 50.0 cN and $v_{30}$ melt extensibility of 225 to 300 mm/s, yet more preferably an $F_{30}$ melt strength of 25.0 to 50.0 cN and $v_{30}$ melt extensibility of 230 to 290 mm/s, still yet more preferably an $F_{30}$ melt strength of 25.0 to 45.0 cN and $v_{30}$ melt extensibility of 230 to 290 mm/s, most preferably an $F_{30}$ melt strength of 30.0 to 45.0 cN and $v_{30}$ melt extensibility of 230 to 290 mm/s, like an $F_{30}$ melt strength of 32.0 to 42.0 cN and $v_{30}$ melt extensibility of 230 to 290 mm/s or an $F_{30}$ melt strength of 34.0 to 42.0 cN and $v_{30}$ melt extensibility of 250 to 290 mm/s or an $F_{30}$ melt strength of 34.0 to 42.0 cN and $v_{30}$ melt extensibility of 253 to 290 mm/s.

Further it is preferred that the high melt strength poly-propylene composition has a melt flow rate $MFR_2$ measured according to ISO 1133 of not more than 15.0 g/10 min, more preferably in a range of 0.5 to 15.0 g/10 min, still more preferably in a range of 0.5 to 15.0 g/10 min, yet more preferably in a range of 1.0 to 15.0 g/10 min, like in the range of 1.5 to 15.0 g/10 min or like in the range of 1.0 to 15.0 g/10 min.

In a particularly preferred embodiment the high melt strength polypropylene composition has a melt flow rate $MFR_2$ measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Hence in one specific embodiment, the high melt strength polypropylene composition has

- (a) a melt flow rate $MFR_2$ of not more than 15.0 g/10 min, preferably in a range of 0.5 to 15.0 g/10 min, more preferably in a range of 0.5 to 15.0 g/10 min, yet more preferably in a range of 1.0 to 15.0 g/10 min, like in the range of 1.5 to 15.0 g/10 min or like in the range of 1.0 to 15.0 g/10 min;
- (b) an $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN or 34.0 to 42.0 cN; and
- (c) a $v_{30}$ melt extensibility of more than 200 mm/s, preferably more than 210 to 300 mm/s, like of more than 220 to 300 mm/s, more preferably of more than 225 mm/s, still more preferably of 225 to 300 mm/s, yet more preferably of 230 to 290 mm/s like 250 to 290 mm/s or 253 to 290 mm/s.

In a preferred variant of this embodiment the high melt strength polypropylene composition has a melt flow rate $MFR_2$ measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Accordingly in a specific embodiment the high melt strength polypropylene composition has a melt flow rate $MFR_2$ of not more than 15.0 g/10 min, an $F_{30}$ melt strength of more than 20.0 cN and a v30 melt extensibility of more than 210 to 300 mm/s, like a melt flow rate $MFR_2$ in a range of 0.5 to 15.0 g/10 min, an $F_{30}$ melt strength of more than 20.0 to 50.0 cN and $v_{30}$ melt extensibility of more than 220 to 300 mm/s, more preferably a melt flow rate $MFR_2$ in a range of 0.5 to 15.0 g/10 min, an $F_{30}$ melt strength of more than 21.0 cN and $v_{30}$ melt extensibility of more than 225 mm/s, still more preferably a melt flow rate $MFR_2$ in a range of 1.0 to 15.0 g/10 min, an $F_{30}$ melt strength of 21.0 to 50.0 cN and $v_{30}$ melt extensibility of 225 to 300 mm/s, yet more preferably a melt flow rate $MFR_2$ in a range of 1.0 to 15.0 g/10 min, an $F_{30}$ melt strength of 25.0 to 50.0 cN and $v_{30}$ melt extensibility of 230 to 290 mm/s, still yet more preferably a melt flow rate $MFR_2$ in a range of 1.0 to 15.0 g/10 min, an $F_{30}$ melt strength of 25.0 to 45.0 cN and a $v_{30}$ melt extensibility of 230 to 290 mm/s, most preferably a melt flow rate $MFR_2$ in a range of 1.0 to 15.0 g/10 min, an $F_{30}$ melt strength of 30.0 to 45.0 cN and $v_{30}$ melt extensibility of 230 to 290 mm/s, like a melt flow rate $MFR_2$ in a range of 1.0 to 15.0 g/10 min, an $F_{30}$ melt strength of 32.0 to 42.0 cN and v30 melt extensibility of 230 to 290 mm/s or a melt flow rate $MFR_2$ in a range of 1.0 to 15.0 g/10 min, an $F_{30}$ melt strength of 34.0 to 42.0 cN and $v_{30}$ melt extensibility of 250 to 290 mm/s or a melt flow rate $MFR_2$ in a range of 1.0 to 15.0 g/10 min, an $F_{30}$ melt strength of 34.0 to 42.0 cN and $v_{30}$ melt extensibility of 253 to 290 mm/s.

In a preferred variant of this embodiment the high melt strength polypropylene composition has a melt flow rate $MFR_2$ measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

The high melt strength polypropylene composition further preferably has a low gel content, usually below 1.00 wt %. Preferably the gel content is less than 0.80 wt %, more preferably less than 0.50 wt %.

In a preferred variant of this embodiment the high melt strength polypropylene composition has a melt flow rate $MFR_2$ measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

The high melt strength polypropylene composition further preferably has a melting temperature of from 140 to 180° C., preferably from 150 to 175° C., most preferably from 155 to 170° C.

Additionally, the high melt strength polypropylene composition preferably has a crystallization temperature of from 110 to 150° C., preferably from 115 to 140° C. and most preferably from 120 to 135° C.

Layer (A)

Layer (A) is a foamed sheet comprising the high melt strength polypropylene composition as described above or below.

Layer (A) preferably comprises at least 70 wt %, more preferably at least 80 wt %, more preferably at least 90 wt %, yet more preferably at least 95 wt %, of the high melt strength polypropylene composition. In a preferred embodiment the foam consists of the high melt strength polypropylene composition (apart from the foaming agents if still present in the foam after the foaming process).

The density of the foamed sheet of layer (A) is preferably 100 to 300 kg/m³, preferably from 125 to 275 kg/m³, more preferably from 150 to 250 kg/m³ and most preferably from 175 to 225 kg/m³.

The foam preferably has a cell size diameter, determined by light optical microscope, of 100 to 500 μm, more preferably 125 to 400 μm and most preferably 170 to 320 μm.

The foam is further characterized by its surface roughness. Usually the surface roughness is below 3.5 μm, preferably below 2.5 μm and most preferably below 1.5 μm.

Layer (B)

Layer (B) is a non-foamed layer, which comprises a polypropylene composition, preferably in an amount of at least 85 wt %, more preferably at least 90 wt % and most preferably at least 95 wt %. In a preferred embodiment layer (B) consists of the polypropylene composition.

The polypropylene composition comprises from 85.0 to 100 wt %, preferably from 90.0 to 99.9 wt % and most preferably from 95.0 to 99.8 wt % of a linear propylene polymer, based on the total weight amount of the polypropylene composition.

The linear propylene polymer can be a linear random propylene copolymer, or a linear propylene homopolymer, the latter being preferred.

In case the linear propylene polymer is a linear random propylene copolymer, it comprises monomers copolymerizable with propylene, for example comonomers such as ethylene and/or $C_4$ to $C_{12}$ alpha-olefins, in particular ethylene and/or $C_4$ to $C_{10}$ α-olefins, e.g. 1-butene and/or 1-hexene. Preferably the linear random propylene copolymer comprises, especially consists of, monomers copolymerizable with propylene from the group consisting of ethylene, 1-butene and 1-hexene. More specifically the linear random propylene copolymer comprises—apart from propylene—units derivable from ethylene and/or 1-butene. In a preferred embodiment the linear random propylene copolymer comprises units derivable from ethylene and propylene only. The comonomer content in the linear random propylene copolymer is preferably in the range of more than 0.2 to 10.0 mol %, still more preferably in the range of more than 0.5 to 7.0 mol %.

The polypropylene composition can comprise additives in an amount of up to 15.0 wt %, preferably from 0.1 to 10.0 wt % and most preferably from 0.2 to 5.0 wt %. Suitable additives are preferably selected from the group comprising antioxidants, stabilizers, fillers, colorants, nucleating agents and antistatic agents In general, they are incorporated during granulation of the pulverulent product obtained in the polymerization.

The additives can be added to the polypropylene composition in form of masterbatches. These masterbatches usually include small amounts of polymers.

These polymers of the masterbatches are not counted to other polymeric components but to the amount of additives in the polypropylene composition.

The polypropylene composition may also include small amounts of other polymer components different from the linear polymer of propylene.

However, it is preferred that the linear polymer of propylene is the only polymeric component in the propylene polymer composition.

The polypropylene composition preferably has a melt flow rate $MFR_2$ of 5.0 to 50.0 g/10 min, more preferably from 10.0 to 40.0 g/10 min, still more preferably from 15.0 to 35.0 g/10 min, and most preferably from 20.0 to 30.0 g/10 min, determined according to ISO 1133.

The polypropylene composition preferably has a density of from 890 to 910 kg/m$^3$.

Multilayer Sheet

The present invention is directed to a multilayer sheet comprising the foamed sheet as described above or below as layer (A) and a coating layer, which is a coated non-foamed layer as described above or below as layer (B), wherein layers (A) and (B) are in adherent contact with each other.

The multilayer sheet can comprise one or more additional layers under the proviso that layers (A) and (B) are in adherent contact with each other. The one or more additional layers can be subjected to the multilayer sheet on either surface of layers (A) and/or (B) in a configuration (X)-(A)-(B), (A)-(B)-(Y) or (X)-(A)-(B)-(Y), with layer(s) (X) being one or more layers being in adherent contact with layer (A) on the opposite surface of the adherent contact of layer (A) with layer (B) and layer(s) (Y) being one or more layers being in adherent contact with layer (B) on the opposite surface of the adherent contact of layer (B) with layer (A).

The optional additional layers can be of any suitable material but preferably are of polypropylene compositions, if present, in order to ensure good recycling properties.

It is, however, preferred that the multilayer sheet consists of layers (A) and (B).

It is especially preferred that the multilayer sheet does not include any adhesive layers for improving adhesion between two layers of the multilayer sheet.

The multilayer sheet preferably has a total thickness of from 500 to 1000 μm, more preferably from 575 to 950 μm, still more preferably from 600 to 900 μm and most preferably from 625 μm to 850 μm.

Preferably, layer (A) has a thickness of from 455 to 850 μm, more preferably from 525 to 825 μm, more preferably from 550 to 800 μm, most preferably from 565 to 765 μm.

Further, layer (B) preferably has a thickness of of from 45 to 150 μm, more preferably from 50 to 125 μm, still more preferably from 55 to 100 μm and most preferably from 60 to 85 μm.

The multilayer sheet preferably has a grammage of from 150 to 300 g/m$^2$, more preferably from 175 to 280 g/m$^2$, most preferably 200 to 260 g/m$^2$.

The multilayer sheet according to the invention surprisingly shows an improved balance of properties in mechanical strength and barrier properties, which allows the use as packaging material for perishable food such as dairy products. With layers (A) and (B) both comprising polypropylene compositions high recycling rates of the multilayer sheet can be accomplished.

The multilayer sheet preferably has a tensile modulus in machine direction of from 300 to 600 MPa, more preferably 350 to 550 MPa, most preferably 375 to 500 MPa.

Further, the multilayer sheet preferably has a tensile modulus in transverse direction of from 300 to 600 MPa, more preferably 350 to 550 MPa, most preferably 375 to 500 MPa.

Still further, the multilayer sheet preferably has an elongation at break in machine direction of from 10 to 100%, more preferably 15 to 80%, most preferably 20 to 70%.

Further, the multilayer sheet preferably has an elongation at break in transverse direction of from 10 to 100%, more preferably 15 to 80%, most preferably 20 to 70%.

Additionally, the multilayer sheet preferably has an elongation at yield in machine direction of from 2.0 to 30.0%, preferably 5.0 to 25.0%, most preferably 10.0 to 20.0%.

It is further preferred that the multilayer sheet has a nominal tensile strain at break in machine direction of from 5 to 60%, more preferably 10 to 50%, most preferably 15 to 40%.

Additionally, the multilayer sheet preferably a nominal tensile strain at break in transverse direction of from 5 to 60%, more preferably 10 to 50%, most preferably 15 to 400%.

Still further, the multilayer sheet preferably has a tensile strength in machine direction of from 2.0 to 30.0 MPa, more preferably 3.5 to 25.0 MPa, most preferably 5.0 to 20.0 MPa.

Additionally, the multilayer sheet preferably has a tensile strength in transverse direction of from 2.0 to 30.0 MPa, more preferably 3.5 to 25.0 MPa, most preferably 5.0 to 20.0 MPa.

It is further preferred that the multilayer sheet has a tensile stress at break in machine direction of from 2.0 to 30.0 MPa, more preferably 3.5 to 25.0 MPa, most preferably 5.0 to 20.0 MPa.

Still further, the multilayer sheet preferably has a tensile a tensile stress at break in transverse direction of from 2.0 to 30.0 MPa, more preferably 3.5 to 25.0 MPa, most preferably 5.0 to 20.0 MPa.

Additionally, the multilayer sheet preferably has a tensile stress at yield in machine direction of from 2.0 to 30.0 MPa, preferably 3.5 to 25.0 MPa, most preferably 5.0 to 20.0 MPa.

Regarding barrier properties, the multilayer sheet preferably has a water vapor transmission rate WVTR at 23° C. and 85% RH of less than 1.00 g/(m$^2$·d), more preferably from 0.01 to 0.75 g/(m$^2$·d), still more preferably from 0.10 to 0.60 g/(m$^2$·d), even more preferably from 0.20 to 0.50 g/(m$^2$·d) and most preferably from 0.30 to 0.40 g/(m$^2$·d).

Further, the multilayer sheet preferably has an oxygen transmission rate OTR at 23° C. and 50% RH of less than 2000 cm$^3$/(m$^2$·d·bar), more preferably from 250 to 1500 cm$^3$/(m$^2$·d·bar), still more preferably from 350 to 1000

$cm^3/(m^2 \cdot d \cdot bar)$, even more preferably from 500 to 900 $cm^3/(m^2 \cdot d \cdot bar)$ and most preferably from 650 to 800 $cm^3/(m^2 \cdot d \cdot bar)$.

Additionally, the multilayer sheet preferably has an oxygen transmission rate OTR at 5° C. and 0% RH of less than 750 $cm^3/(m^2 \cdot d \cdot bar)$, more preferably from 100 to 600 $cm^3/(m^2 \cdot d \cdot bar)$, still more preferably from 150 to 500 $cm^3/(m^2 \cdot d \cdot bar)$, even more preferably from 200 to 400 $cm^3/(m^2 \cdot d \cdot bar)$ and most preferably from 250 to 350 $cm^3/(m^2 \cdot d \cdot bar)$.

Process

In another aspect the present invention relates to a process for producing the multilayer sheet as described above or below comprising the steps of:

a) foaming the high melt strength polypropylene composition to a foamed sheet having a density of from 100 to 300 $kg/m^3$, preferably from 125 to 275 $kg/m^3$, more preferably from 150 to 250 $kg/m^3$ and most preferably from 175 to 225 $kg/m^3$ to form layer (A);

b) coating layer (A) with the polypropylene composition to obtain layer (B) in adherent contact with layer (A).

For foaming the foamed sheet of layer (A) in process step a) the high melt strength propylene polymer and the high melt strength polypropylene composition as described above or below are provided.

As already outlined above, the high melt strength propylene polymer is preferably produced by using the unmodified propylene polymer, preferably the linear propylene polymer. The process preferably further comprises at least a step (i) in which an unmodified propylene polymer is reacted with a thermally decomposing free radical-forming agent and optionally with bifunctionally unsaturated monomer(s) and/or with multifunctionally unsaturated low molecular weight polymer(s) obtaining thereby the high melt strength propylene polymer.

Preferably the process comprises subsequent to step (i) a further step (ii), in which to the high melt strength propylene polymer, a nucleating agent as described above or below is added. As already outlined above, the nucleating agent may be added separately or as mixture with an additional propylene polymer. Further additives may optionally be present usually as mixture with the additional propylene polymer, if present.

Even more preferred the instant process comprises subsequent to step (i) a further step (ii), in which to the high melt strength propylene polymer, the nucleating agent and, optionally further additives, i.e. different from the nucleating agent are added. This may be accomplished using the additive mixture outlined above. The result of process step (ii) is the high melt strength polypropylene composition.

Subsequently the so produced high melt strength polypropylene composition is subjected to a foaming process obtaining thereby a foamed sheet comprising the instant high melt strength polypropylene composition in process step (a).

Concerning the definitions and preferred embodiments of the foamed sheet, the high melt strength polypropylene composition, the high melt strength propylene polymer, the unmodified propylene polymer, the nucleating agent, the additives, the additional propylene polymer and the additive mixture reference is made to the information provided above.

As mentioned above, in optional step (i) of the process the high melt strength propylene polymer is obtained by treating the unmodified propylene polymer, preferably the linear propylene polymer, with thermally decomposing radical-forming agents. However in such a case a high risk exists that the unmodified propylene polymer, preferably the linear propylene polymer, is degraded, which is detrimental. Thus it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the high melt strength propylene polymer, is for instance disclosed in EP 0 787 750, EP 0 879 830 A1 and EP 0 890 612 A2. All documents are herewith included by reference. Thereby, the amount of thermally decomposing radical-forming agents, preferably of peroxide, is preferably in the range of 0.05 to 3.00 wt.-% based on the amount of the unmodified propylene polymer. Typically the thermally decomposing radical-forming agents are added together with the bifunctionally unsaturated monomer(s) and/or with multifunctionally unsaturated low molecular weight polymer(s) to the unmodified propylene polymer, preferably to the linear propylene polymer. However it is also possible, but less preferred, that first the bifunctionally unsaturated monomer(s) and/or multifunctionally unsaturated low molecular weight polymer(s) is/are added to the unmodified propylene polymer, preferably to the linear propylene polymer, and subsequent the thermally decomposing radical-forming agents, or the other way round, first the thermally decomposing radical-forming agents are added to the unmodified propylene polymer, preferably to the linear propylene polymer, and subsequent the bifunctionally unsaturated monomer(s) and/or multifunctionally unsaturated low molecular weight polymer(s).

Concerning the bifunctionally unsaturated monomer(s) and/or multifunctionally unsaturated low molecular weight polymer(s) used for the manufacture of the high melt strength propylene polymer, reference is made to the section "the melt strength propylene polymer".

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

In one variant step (ii) is initiated when at least 70%, preferably at least 80%, yet more preferably at least 90%, like at least 95 or 99%, of the reaction between the unmodified propylene polymer and the thermally decomposing free radical-forming agent and optionally the bifunctionally unsaturated monomer has taken place to obtain the high melt strength propylene polymer.

Unless otherwise mentioned to the contrary in the following preferred embodiments of this variant are described.

In a preferred embodiment, an extruder, such as a twin screw extruder, is used for step (i) and for the optional step (ii).

The use of an extruder is particularly advantageous in that it can simultaneously be used for the preparation of the high melt strength propylene polymer and subsequent for adding the nucleating agent to said high melt strength propylene polymer. As outlined above, the nucleating agent may be added separately or together with further additives different from the nucleating agent.

In a preferred embodiment, the unmodified propylene polymer is added to an extruder together with—as described in detail above—the thermally decomposing free radical-forming agent, preferably a peroxide, and optionally with the bifunctionally unsaturated monomer(s) and/or with the multifunctionally unsaturated low molecular weight polymer(s), preferably with the bifunctionally unsaturated monomer(s) selected from divinyl compounds, allyl compounds or dienes, to provide the high melt strength propylene polymer, in step (i). It is also possible to use a combination of an extruder downstream of a pre-mixing device, wherein the bifunctionally unsaturated monomer(s) and/or the multifunctionally unsaturated low molecular weight polymer(s) and the thermally decomposing free radical-forming agent are added to the polypropylene in the pre-mixing device.

Subsequently, in a step (ii) the nucleating agent, the additional propylene polymer, if present, and the additives, i.e. different from the nucleating agent, if present, are preferably added at the downstream end of the extruder screw in order not to interfere with the modification reaction for providing the high melt strength propylene polymer, as described above.

In this respect, the term "downstream end of the extruder screw" is understood as within the last 75% of the length of the extruder screw, preferably within the last 70% of the length of the extruder screw, more preferably at least 65% of the length of the extruder screw.

Accordingly, the extruder (E) used for the instant process preferably comprises in operation direction a feed-throat (FT), a first mixing zone (MZ1), a second mixing zone (MZ2) and a die (D), wherein between the first mixing zone (MZ1) and the second mixing zone (MZ2) a side feed-throat (SFT) is located. Preferably the extruder is a screw extruder, like a twin screw extruder. Accordingly the unmodified propylene polymer, the thermally decomposing free radical-forming agent, preferably a peroxide, and optionally the bifunctionally unsaturated monomer and/or the multifunctionally unsaturated low molecular weight polymer monomer, preferably selected from divinyl compounds, allyl compounds or dienes, but not the nucleating agent, not the additional propylene polymer, if present, and not the additives different from the nucleating agent, if present, are fed via the feed-throat (FT), thereby preferably using a feeder, into the extruder and is/are subsequently passed downstream through the first mixing zone (MZ1). Preferably the shear stress in said first mixing zone (MZ1) is of such extent that the unmodified propylene polymer is molten and the chemical reaction with the radical-forming agent and with the optional bifunctionally unsaturated monomer and/or multifunctionally unsaturated low molecular weight polymer is initiated. After the first mixing zone (MZ1), i.e. between the first mixing zone (MZ1) and the second mixing zone (MZ2), the nucleating agent, the additional propylene polymer, if present, and the additives different from the nucleating agent, if present, is/are added, i.e. fed into the extruder. Preferably the nucleating agent, the additional propylene polymer, if present, and the additives different from the nucleating agent, if present, is/are added via the side feed-throat (SFT), thereby preferably using a side feeder. Subsequently all components of the high melt strength polypropylene composition, including the nucleating agent, the additional propylene polymer, if present, and the additives different from the nucleating agent, if present, are passed downstream through the second mixing zone (MZ2). Finally the polypropylene composition is discharged via the die (D).

Preferably, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

In another preferred variant, the high melt strength propylene polymer obtained in step (i) is separated prior to further processing. Such a separation may include storage and transport of the high melt strength propylene polymer to another facility.

Unless otherwise mentioned to the contrary in the following preferred embodiments of this variant are described.

In this variant in process step (ii) the high melt strength propylene polymer is combined with the nucleating agent whereby the nucleating agent may be added separately or as mixture with the additional propylene polymer. Further additives different from the nucleating agent may optionally be present usually as mixture with the additional propylene polymer, if present.

In a preferred embodiment, an extruder, such as a twin screw extruder, is used for step (i).

In a preferred embodiment, the unmodified propylene polymer is added to an extruder together with—as described in detail above—the thermally decomposing free radical-forming agent, preferably a peroxide, and optionally with the bifunctionally unsaturated monomer(s) and/or with the multifunctionally unsaturated low molecular weight polymer(s), preferably with the bifunctionally unsaturated monomer(s) selected from divinyl compounds, allyl compounds or dienes, to provide the high melt strength propylene polymer, in step (i). It is also possible to use a combination of an extruder downstream a pre-mixing device, wherein the bifunctionally unsaturated monomer(s) and/or the multifunctionally unsaturated low molecular weight polymer(s)

and the thermally decomposing free radical-forming agent are add to the polypropylene in the pre-mixing device.

Accordingly, the extruder (E) used for the preparation of the high melt strength propylene polymer preferably comprises in operation direction a feed-throat (FT), a first mixing zone (MZ1), optionally, a second mixing zone (MZ2) and a die (D). Preferably the extruder is a screw extruder, like a twin screw extruder. Accordingly the unmodified propylene polymer, the thermally decomposing free radical-forming agent, preferably a peroxide, and optionally the bifunctionally unsaturated monomer and/or the multifunctionally unsaturated low molecular weight polymer monomer, preferably selected from divinyl compounds, allyl compounds or dienes, but not the nucleating agent, not the additional propylene polymer, if present, and not the additives different from the nucleating agent, if present, are fed via the feed-throat (FT), thereby preferably using a feeder, into the extruder and is/are subsequently passed downstream through the first mixing zone (MZ1). Preferably the shear stress in said first mixing zone (MZ1) is of such extent that the unmodified propylene polymer is molten and the chemical reaction with the radical-forming agent and with the optional bifunctionally unsaturated monomer and/or multifunctionally unsaturated low molecular weight polymer is initiated.

After the first mixing zone (MZ1), the obtained product is passed downstream through the second mixing zone (MZ2), if present. Finally the high melt strength propylene polymer is discharged via the die (D).

In case the second mixing zone is present, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

The thus obtained high melt strength propylene polymer is then combined in step (ii) with the nucleating agent, the additional propylene polymer, if present, and the additives different from the nucleating agent, if present In a preferred embodiment, an extruder, such as a twin screw extruder, is used for step (ii).

In a preferred embodiment, the high melt strength propylene polymer is added to an extruder together with—as described in detail above—the nucleating agent, the additional propylene polymer, if present, and the additives different from the nucleating agent, if present, are fed via the feed-throat (FT). It is also possible to use a combination of an extruder downstream a pre-mixing device, wherein the nucleating agent, the additional propylene polymer, if present, and the additives different from the nucleating agent, if present are added to the high melt strength propylene polymer in the pre-mixing device.

Accordingly, the extruder (E) used for the preparation of the high melt strength propylene composition preferably comprises in operation direction a feed-throat (FT), a first mixing zone (MZ1), optionally, a second mixing zone (MZ2) and a die (D). Preferably the extruder is a screw extruder, like a twin screw extruder. Accordingly the high melt strength propylene polymer, the nucleating agent, the additional propylene polymer, if present, and the additives different from the nucleating agent, if present, are fed via the feed-throat (FT), thereby preferably using a feeder, into the extruder and is/are subsequently passed downstream through the first mixing zone (MZ1). Preferably the shear stress in said first mixing zone (MZ1) is of such extent that the high melt strength propylene polymer is molten and mixing with the nucleating agent, the additional propylene polymer, if present, and the additives different from the nucleating agent, if present, is initiated.

After the first mixing zone (MZ1), the obtained product is passed downstream through the second mixing zone (MZ2), if present. Finally the high met strength polypropylene composition is discharged via the die (D).

In case the second mixing zone is present, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

In the following preferred features of all embodiments and variants of the process are described unless explicitly mentioned to the contrary.

The foaming process is in the skilled knowledge. In such a process, a melt of the high melt strength polypropylene composition comprising a gaseous or liquid foaming agent such as butane, mixtures of butane and propane, HFC or $CO_2$ is suddenly expanded through pressure drop. Preferably a liquid blowing agent is used, e.g. butane or mixtures of butane and propane. Continuous foaming processes as well as discontinuous process may be applied. In a continuous foaming process, the polypropylene composition is melted and laden with gas in an extruder under pressures typically above 20 bar before being extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004). Processes for foaming are outlined in S. T. Lee, Foam Extrusion, Technomic Publishing (2000). In a discontinuous foaming process, the polypropylene composition (micro-) pellets are laden with foaming agent under pressure and heated below melting temperature before the pressure in the autoclave is suddenly relaxed. The dissolved foaming agent forms bubbles and creates a foam structure. The preparation of discontinuously foamed beads is described for example in DE 3 539 352.

The amount of foaming agent is usually below 10 wt % based on the total weight of the polymer composition and the foaming agent, preferably below 5 wt % based on the total weight of the polymer composition and the foaming agent.

Preferred foaming agents are butane and mixtures of butane and propane.

As outlined above, preferably a foamed sheet is formed. Methods for forming foamed sheets are generally known in the art and inter alia described in TW M 463649, which is hereby incorporated by reference in its entirety. Preferably the method and apparatus described in TW M 463649 is used to prepare the foamed sheet as described above or below.

After obtaining the foamed sheet as described above or below as layer (A) in process step (a) layer (B) is coated onto one surface of the foamed sheet of layer (A) in process step (b) to obtain the multilayer sheet of the present invention.

For process step (b) the polypropylene composition comprising the linear propylene polymer of layer (B) is melted and coated onto one surface of the foamed sheet of layer (A) to form layer (B) in adherent contact with layer (A). Such coating processes are well established in the art.

The polypropylene composition of layer (B) can be commercially available or being produced with any process suitable for producing a polypropylene composition. Regarding the polypropylene composition and the linear propylene polymer of layer (B) reference is made to the description above or below.

The process for producing the multilayer sheet according to the invention can further comprise additional steps of applying additional layer(s) (X) and/or (Y) onto one surface of either layer (A) or layer (B) or both. For applying said additional layer(s) (X) and/or (Y) any application method known in the art suitable for applying these layers are applicable.

Regarding the optional additional layer(s) (X) and/or (Y) reference is made to the accordant description above or below.

It is, however, preferred that the process of the invention does not include a process step of applying additional layer(s) (X) and/or (Y) onto one surface of either layer (A) or layer (B) or both.

Article

In yet another aspect the present invention relates to an article comprising the multilayer sheet as described above or below.

In still another aspect the present invention relates to the use of the multilayer sheet as described above or below for the production of an article with improved water vapor transmission and oxygen transmission properties.

Said article is preferably a food packaging, preferably food packaging for perishable food such as a dairy packaging like a milk carton and cups for cream cheese or yogurt.

In said article, preferably the food packaging, the multilayer sheet is preferably formed as such that layer (B) is on the inner side of the article, preferably in contact with the content of the article, such as the food, preferably the perishable food such as the dairy product like milk, cream cheese or yogurt.

EXAMPLES

1. Measurement Methods

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

Melting Temperature $(T_m)$ and Heat of Fusion $(H_f)$, Crystallization Temperature $(T_c)$ and Heat of Crystallization $(H_c)$:

The melting temperature $T_m$ and crystallisation temperature $T_c$ were measured with a TA Instruments Q2000 differential scanning calorimetry device (DSC) according to ISO 11357/3 on 5 to 10 mg samples. Crystallisation and melting temperatures were obtained in a heat/cool/heat cycle with a scan rate of 10° C./min between 30° C. and 225° C. Melting and crystallisation temperatures were taken as the peaks of the endotherms and exotherms in the cooling cycle and the second heating cycle respectively.

Melt flow rate $MFR_2$ is measured according to ISO 1133 at a temperature of 230° C. and a load of 2.16 kg load.

$F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Sience, Vol. 36, pages 925 to 935. The content of the document is included by reference. The strain hardening behaviour of polymers is analysed by Rheotens apparatus (product of Gottfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 $mm/sec^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Gel Content

About 2 g of the polymer $(m_p)$ are weighted and put in a mesh of metal which is weighted $(m_{p+m})$. The polymer in the mesh is extracted in a soxhlet apparatus with boiling xylene for 5 hours. The eluent is then replaced by fresh xylene and the boiling is continued for another hour. Subsequently, the mesh is dried and weighted again $(m_{XHU+m})$. The mass of the xylene hot unsolubles $(m_{XHU})$ obtained by the formula $m_{XHU+m} - m_m = m_{XHU}$ is put in relation to the weight of the polymer $(m_p)$ to obtain the fraction of xylene insolubles $m_{XHU}/m_p$.

Density of the Foam

This has been measured using an analytical and semi-micro precision balance of Switzerland PRECISA Gravimetrics AG, Switzerland, the specific gravity balance (XS225A); test method: application of Archimedes, automatically calculate the density of the sample.

Cell Size Diameter of the Foam

The cell size diameter of the foam was determined using a light optical microscope of Tawain CBS Stereoscopic microscope;

The testing method used is as follows:

1. Cut a strip of the foamed material along the cross direction (CD) and machine direction (MD).

2. Hold the foamed material with a flat clamp and use a razor blade to perform a fine shave.

3. Focus the microscope at 100× and adjust lighting onto the foamed material.

4. Perform length and width measurements of each unique cell in the CD and MD orientation and record values.

5. Count the number of measured unique cells and record the values.
6. Perform cell wall thickness measurements across 3-4 tangent lines to overall length of each unique cell in the CD and MD orientation and record the values.
7. Perform three overall strip thickness measurements starting from the bottom of the first measured cell group, to the middle of the cell group, to the top of the cell group.
8. Perform an overall length measurement starting from the lowest complete cell to the highest complete cell.
9. Move microscope visual field so the bottom of the most upper incomplete cell is touching the bottom of the screen.
10. Repeat steps 4-9 on each new unique cell until about 0.200" to 0.800" of the strip is measured. Ensure that the overall length and cell composition does not overlap. Each overall length measurement after the first measurement is taken from the top of the previous highest complete cell to the top of the current highest complete cell.

Surface Roughness of the Foam

This has been measured using the portable surface roughness tester, model SJ-310 of Mitutoyo, Japan. The surface roughness tester (also known as a profilometer) is a contact surface roughness tester. The roughness determination is fully automated and runs via the included software.

Grammage is determined according to ASTM D645.

Mechanical properties such as nominal strain at break, elongation at break, elongation at yield, tensile modulus, tensile strength, tensile stress at break and tensile stress at yield were measured on the multilayer sheet of example IE1 and the LDPE laminated paper sheet of comparative example CE2 in machine direction and traverse direction according to according to ISO 527-3 at 23° C. Testing was performed at a cross head speed of 1 mm/min.

Water vapour transmission rate (WVTR) was measured on the multilayer sheet of example IE1 and the LDPE laminated paper sheet of comparative example CE2 according to standard ISO 15106-3:2003.

Device: Mocon Aquatran
Temperature: 38° C.±0.3° C.
Relative Humidity: 0/100%
Area sample: 5 cm²

Oxygen transmission rate (OTR) was measured on the multilayer sheet of example IE1 and the LDPE laminated paper sheet of comparative example CE2 as test specimens. The specimen is mounted as a sealed semi-barrier between two chambers at ambient atmospheric pressure. One chamber is slowly purged by a stream of nitrogen and hydrogen gas mixture (2% $H_2$ in $N_2$) at a given temperature and relative humidity and the other chamber is purged by a stream of oxygen at the same temperature and relative humidity as the $N_2$ stream. As oxygen gas permeates through the film into the nitrogen carrier gas, it is transported to the coulometric detector where it produces an electrical current, the magnitude of which is proportional to the amount of oxygen flowing into the detector per unit time. The oxygen transmission rate test is performed as per ASTM D 3985, at 23° C. and 50% relative humidity and at 5° C. and 0% relative humidity, with using 10 sccm of $N_2/H_2$ and $O_2$ (99.999%) gases and a sheet surface area of 1 cm².

2. Preparation of a Multilayer Sheet

The following steps are applied:
1. Preparing of a blend of 91 wt % Daploy™ WB140HMS of Borealis AG with 9 wt % of a nucleating agent masterbatch consisting of 77 wt % talc and 23 wt % of Daploy™ WB140HMS (total amount of talc in the blend: about 7 wt %). The high melt strength polypropylene WB140HMS has a melt flow rate $MFR_2$ (230° C.) of 2.1 g/10 min, a melt strength $F_{30}$ of 36 cN and a melt extensibility $v_{30}$ of 255 mm/s. Talc is the commercial product HV4 of IMIFABI company having a particle size $d_{50}$ of 7 μm and a $d_{95}$ of 20 μm;
2. feeding the blend obtained in the $1^{st}$ step into a $1^{st}$ single screw extruder of Pitac Taiwan (screw diameter 90 mm; L/D ratio 26). The extruder is operated at a temperature of 200° C. (5 heating zones: 150° C.; 200° C.; 200° C.; 200° C.; 200° C.) so as to melt the polymer;
3. injecting of 3 wt % liquid butane (as blowing agent) in the last section of the $1^{st}$ single screw extruder obtaining a molten blend;
4. passing the molten blend through a $2^{nd}$ single screw extruder of Pitac Taiwan (screw diameter 120 mm; L/D ratio 34) thereby cooling down the molten blend to 160° C. at the end of the $2^{nd}$ single screw extruder;
5. passing the molten blend of the $4^{th}$ step through an extruding die placed at the end of the $2^{nd}$ extruder; when exiting the extruder the molten blend is exposed to a pressure drop into atmospheric pressure; by the sudden pressure drop the blowing agent in the molten blend expands and thereby accomplishes foaming resulting in a foamed structure; subsequently the foamed structure is cooled at cooling-drums with temperature below 100° C. thereby obtaining a foamed sheet having a density of 200 kg/m³ and a thickness of 667 μm;
6. thereafter the foamed sheet is coated on one surface with the commercial polypropylene PC932 of LCY of Taiwan thereby obtaining a 2 layer sheet of 667 μm foamed sheet as layer (A) and 69-78 μm coating layer (B) to an overall thickness of the 2 layer sheet of about 0.7 mm.

The mechanical and barrier properties of the 2 layer sheet produced as described above is compared to the properties of a double side LDPE laminated paper sheet having a thickness of 0.4 mm. The results are shown below in Table 1.

TABLE 1

Properties of the 2 layer sheet (IE1) and the double side LDPE laminated paper sheet (CE2)

| Properties | IE1 | CE2 |
|---|---|---|
| Sheet properties: | | |
| Sheet thickness [mm] | 0.7 | 0.4 |
| Foam thickness (layer (A)) [μm] | 667 | — |
| PP coating thickness (layer (B)) [μm] | 69-78 | — |
| Foam density [kg/m³] | 200 | — |
| Paper thickness [μm] | — | 398-411 |
| LDPE coating thickness inside [μm] | — | 26-39 |
| LDPE coating thickness outside [μm] | — | 28-31 |
| Grammage [g/m²] | 230 | 304 |
| Mechanical properties: | | |
| Nominal strain at break (MD) [%] | 33.2 | 2.0 |
| Elongation at break (MD) [%] | 60.6 | 2.5 |
| Elongation at yield (MD) [%] | 15.0 | n.d. |
| Tensile modulus (MD) [MPa] | 408 | 4055 |
| Tensile strength (MD) [MPa] | 8.3 | 42.2 |
| Tensile stress at break (MD) [MPa] | 6.4 | 42.2 |
| Tensile stress at yield (MD) [MPa] | 8.5 | n.d. |
| Nominal strain at break (TD) [%] | 16.4 | 4.4 |
| Elongation at break (TD) [%] | 23.2 | 6.0 |
| Elongation at yield (TD) [%] | n.d. | 6.1 |

TABLE 1-continued

Properties of the 2 layer sheet (IE1) and the
double side LDPE laminated paper sheet (CE2)

| Properties | IE1 | CE2 |
|---|---|---|
| Tensile modulus (TD) [MPa] | 416 | 1650 |
| Tensile strength (TD) [MPa] | 12.3 | 21.8 |
| Tensile stress at break (TD) [MPa] | 12.3 | 21.8 |
| Tensile stress at yield (TD) [MPa] | n.d. | 21.8 |
| Barrier properties: | | |
| OTR (23° C., 50% RH) [cm$^3$/ (m$^2$ · d · bar)] | 760 | 2210 |
| OTR (5° C., 0% RH) [cm$^3$/ (m$^2$ · d · bar)] | 290 | 790 |
| WVTR (23° C., 85% RH) [g/ (m$^2$ · d)] | 0.37 | 2.46 | n.d. not determined

The invention claimed is:

1. A multilayer sheet consisting of two layers (A) and (B), wherein:

layer (A) is a foamed sheet having a density of from 100 to 300 kg/m$^3$, and comprises a high melt strength polypropylene composition comprising from 85.0 to 100 wt % of a high melt strength propylene polymer with long chain branches, based on the total weight amount of the high melt strength polypropylene composition;

layer (B) is a coated non-foamed layer, which consists of a polypropylene composition comprising from 85.0 to 100 wt % of a linear propylene polymer, based on the total weight amount of the polypropylene composition, wherein the linear polymer of propylene is the only polymeric component in the polypropylene composition, and wherein the polypropylene composition has a melt flow rate MFR2 of 20.0 to 30.0 g/10 min, determined according to ISO 1133;

wherein layers (A) and (B) are in adherent contact with each other, the linear propylene polymer is a linear propylene homopolymer, and the linear polymer of propylene is in the form of a single polymer.

2. The multilayer sheet according to claim 1, having a total thickness of from 500 to 1000 μm.

3. The multilayer sheet according to claim 1, having a grammage of from 150 to 300 g/m$^2$.

4. The multilayer sheet according to claim 1, wherein layer (A) has a thickness of from 455 to 850 μm.

5. The multilayer sheet according to claim 1, wherein layer (B) has a thickness of from 45 to 150 μm.

6. The multilayer sheet according to claim 1, having one or more of the following tensile properties in machine direction:

a tensile modulus in machine direction of from 300 to 600 MPa;

an elongation at break in machine direction of from 10 to 100%;

an elongation at yield in machine direction of from 2.0 to 30.0%;

a nominal tensile strain at break in machine direction of from 5 to 60%;

a tensile strength in machine direction of from 2.0 to 30.0 MPa;

a tensile stress at break in machine direction of from 2.0 to 30.0 MPa; or a tensile stress at yield in machine direction of from 2.0 to 30.0 MPa.

7. The multilayer sheet according to claim 1, having one or more of the following tensile properties in transverse direction:

a tensile modulus in transverse direction of from 300 to 600 MPa;

an elongation at break in transverse direction of from 10 to 100%;

a nominal tensile strain at break in transverse direction of from 5 to 60%;

a tensile strength in transverse direction of from 2.0 to 30.0 MPa; or a tensile stress at break in transverse direction of from 2.0 to 30.0 MPa.

8. The multilayer sheet according to claim 1, having a water vapor transmission rate (WVTR) at 23° C. and 85% RH of less than 1.00 g/(m$^2$19 d).

9. The multilayer sheet according to claim 1, having an oxygen transmission rate (OTR) at 23° C. and 50% RH of less than 2000 cm$^3$/(m$^2$·d·bar) and/or an oxygen transmission rate (OTR) at 5° C. and 0% RH of less than 750 cm$^3$/(m$^2$·d·bar).

10. The multilayer sheet according to claim 1, wherein the high melt strength polypropylene composition has one or more of the following properties:

a melt flow rate MFR2 at a temperature of 230° C. and a load of 2.16 kg in a range of from 0.5 to 15.0 g/10 min;

an F30 melt strength of from more than 20.0 to 50.0 cN;

a v30 melt extensibility of more than 200 mm/s;

a melting temperature of from 140 to 180° C.;

a crystallization temperature of from 110 to 150° C.

11. An article comprising the multilayer sheet according to claim 1.

12. The article according to claim 11, being a food packaging.

* * * * *